United States Patent
Taoka et al.

(10) Patent No.: US 8,780,839 B2
(45) Date of Patent: Jul. 15, 2014

(54) BASE STATION APPARATUS AND INFORMATION FEEDBACK METHOD

(75) Inventors: Hidekazu Taoka, Tokyo (JP); Yuichi Kakishima, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 199 days.

(21) Appl. No.: 13/378,678

(22) PCT Filed: Jun. 23, 2010

(86) PCT No.: PCT/JP2010/060610
§ 371 (c)(1),
(2), (4) Date: Feb. 9, 2012

(87) PCT Pub. No.: WO2010/150798
PCT Pub. Date: Dec. 29, 2010

(65) Prior Publication Data
US 2012/0140723 A1 Jun. 7, 2012

(30) Foreign Application Priority Data
Jun. 23, 2009 (JP) ................................. 2009-148997

(51) Int. Cl.
*H04W 4/00* (2009.01)
*H04W 72/04* (2009.01)

(52) U.S. Cl.
CPC ................................. *H04W 72/0413* (2013.01)
USPC .......................................... 370/329; 370/252

(58) Field of Classification Search
USPC ......................................... 370/252, 310–341
See application file for complete search history.

(56) References Cited

U.S. PATENT DOCUMENTS

| | | | | |
|---|---|---|---|---|
| 8,509,160 B2 * | 8/2013 | Kotecha | ........................ | 370/329 |
| 2009/0175233 A1 * | 7/2009 | Ojala et al. | .................... | 370/329 |
| 2009/0245410 A1 * | 10/2009 | Lee et al. | ....................... | 375/267 |
| 2011/0249629 A1 * | 10/2011 | Ko et al. | ....................... | 370/329 |

FOREIGN PATENT DOCUMENTS

| | | | |
|---|---|---|---|
| JP | 2009-111781 A | 5/2009 | |
| WO | 2010124254 A2 | 10/2010 | |

OTHER PUBLICATIONS

Japanese Office Action for Application No. 2009-148997, mailed on Sep. 11, 2012 (6 pages).
Japanese Office Action for Application No. 2009-148997, mailed on Dec. 11, 2012 (4 pages).
QUALCOMM Europe, "Details on CQI Format"; 3GPP TSG-RAN WG1 #51bis; R1-080492; Jan. 14-18, 2008; Sevilla, Spain; (7 pages).
Huawei, "Feedback method for CQI, PMI and rank"; TSG RAN WG1 meeting #50; R1-073512; Athens, Greece, Aug. 20-24, 2007; (3 pages).

(Continued)

*Primary Examiner* — Kan Yuen
(74) *Attorney, Agent, or Firm* — Osha Liang LLP

(57) ABSTRACT

To suitably transmit feedback information for rank adaptation and precoding in uplink MIMO transmission to a user apparatus as feedback, a base station apparatus (200) is characterized by having a precoding weight/rank number selecting section (232) that determines rank information associated with the number of layers of spatial multiplexing in uplink, while determining a control amount of a transmission phase and/or transmission amplitude used in weighting for transmission antennas of a user apparatus, and transmission/reception sections (206*a*), (206*b*) that transmit the rank information determined in the precoding weight/rank number selecting section (232) to a mobile station (100) using an RRC signal, while transmitting the control amount to the mobile station (100) using a control channel signal.

8 Claims, 11 Drawing Sheets

(56) References Cited

OTHER PUBLICATIONS

Office Action in Japanese Patent Application No. 2009-148997, mailing date May 7, 2013, with English translation thereof (7 pages).
Decision to Grant in Japanese Patent Application No. 2009-148997, mailing date Jul. 2, 2013, with English translation thereof (4 pages).
3GPP TSG-RAN WG1 #53, R1-08219, "Way Forward on DL Signaling of Precoding Infomration for Closed-Loop Spatial Multiplexing," Ericsson et al.; Kansas City, USA, May 5-9, 2008 (4 pages).
3GPP TSG-RAN WG1 #53, R1-082080, "Refinements on Signallinf of CQI/Precoding Information on PDCCH," Ericsson et al.; Kansas City, USA, May 5-9, 2008 (5 pages).
3GPP TSG-RAN WG1 #52bis, R1-081540, "Rank Override Support for Precoder Confirmation," Ericsson; Shenzhen, China, Mar. 31-Apr. 4, 2008 (4 pages).
International Search Report w/translation from PCT/JP2010/060610 dated Aug. 31, 2010 (4 pages).
Espacenet Abstract JP2009111781A dated May 21, 2009 (1 page).
3GPP TSG RAN WG1 53, R1-081979; "Enhancements for LTE-Advanced"; Texas Instruments, Kansas City, MO, USA; May 5-9, 2008 (7 pages).
3GPP TSG RAN WG1 #52bis, R1-081253; "PMI-field compression in PDCCH contents for 4 Tx MIMO"; LG Electronics, Shenzhen, China; Mar. 31-Apr. 4, 2008 (5 pages).
M. Hoshino, et al.; "A Study on precoding control scheme for uplink MIMO in LTE-Advanced"; IEICE Technical Report, vol. 108, No. 358; Dec. 11, 2008; pp. 55-60 (8 pages).
TSG-RAN WG1 #53bis, R1-082468; "Carrier aggregation in LTE-Advanced"; Ericsson, Warsaw, Poland; Jun. 30-Jul. 4, 2008 (6 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).
Notification of Reasons for Rejection for Japanese Patent Application No. 2009-148997 mailed Jun. 19, 2012, with English translation thereof (10 pages).
LG Electronics, 3GPP TSG RAN WG1#57, R1-092131, "Link performance results for frequency non-selective precoding in uplink," San Francisco, USA, May 4-8, 2009 (6 pages).

* cited by examiner

| CODEBOOK INDEX | PMI FOR RANK 1 | PMI FOR RANK 2 |
|---|---|---|
| #0 | $W_{1,0}$ | $W_{2,0}$ |
| #1 | $W_{1,1}$ | $W_{2,1}$ |
| #2 | $W_{1,2}$ | $W_{2,2}$ |
| #3 | $W_{1,3}$ | $W_{2,3}$ |

FIG.2

| CODEBOOK INDEX | PMI FOR RANK 1 | PMI FOR RANK 2 |
|---|---|---|
| #0 | $W_{1,0}$ | $W_{2,0}$ |
| #1 | $W_{1,1}$ | $W_{2,1}$ |
| #2 | $W_{1,2}$ | $W_{2,2}$ |
| #3 | OL TRANSMISSION DIVERSITY | OL MIMO MULTIPLEXING TRANSMISSION |

FIG.3

| INDEX | RANK/PMI | INDEX | RANK/PMI |
|---|---|---|---|
| #0 | RANK1, $W_{1,0}$ | #4 | RANK2, $W_{2,0}$ |
| #1 | RANK1, $W_{1,1}$ | #5 | RANK2, $W_{2,1}$ |
| #2 | RANK1, $W_{1,2}$ | #6 | RANK2 $W_{2,2}$ |
| #3 | RANK1, $W_{1,3}$ | #7 | RANK2, $W_{2,3}$ |

FIG.10

| CODEBOOK INDEX | RANK/PMI | CODEBOOK INDEX | RANK/PMI |
|---|---|---|---|
| #0 | RANK1, $W_{1,0}$ | #4 | RANK2, $W_{2,0}$ |
| #1 | RANK1, $W_{1,1}$ | #5 | RANK2, $W_{2,1}$ |
| #2 | RANK1, $W_{1,2}$ | #6 | RANK2 $W_{2,2}$ |
| #3 | OL TRANSMISSION DIVERSITY | #7 | OL MIMO MULTIPLEXING TRANSMISSION |

FIG.11

BASE STATION APPARATUS AND INFORMATION FEEDBACK METHOD

TECHNICAL FIELD

The present invention relates to a base station apparatus and information feedback method, and more particularly, to a base station apparatus and information feedback method for supporting multi-antenna transmission in uplink.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, it is scheduled to expand the maximum system band of 20 MHz in LTE specifications to about 100 MHz.

In addition, the MIMO antenna system has been proposed as radio communication techniques for transmitting and receiving data using a plurality of antennas and improving throughput and spectral efficiency (for example, see Non-patent Document 1). In the LTE-scheme system, two modes, spatial multiplexing transmission mode (SU-MIMO (Single User MIMO) and transmission diversity transmission mode, are specified as a downlink MIMO mode. The spatial multiplexing transmission mode is to spatially multiplex signals of a plurality of streams in the same frequency and time, and is effective at increasing the peak data rate. The transmission diversity transmission mode is to transmit a signal of the same stream subjected to space-frequency (time) coding from a plurality of antennas, and is effective at improving the reception quality at cell-edge users by transmission antenna diversity effect.

In such a MIMO antenna system, techniques (rank adaptation) have been proposed to control the number of layers for spatial multiplexing to be optimal corresponding to the reception status in each mobile station receiver. In this rank adaptation, based on the downlink channel information (reception SINR, fading correlation between antennas), the base station transmitter controls so as to perform information transmission in the spatial multiplexing transmission mode for mobile station receivers excellent in the channel state, while performing information transmission in the transmission diversity transmission mode for mobile station receivers poor in the channel state. In this rank adaptation, the mobile station transmitter transmits the number of layers for spatial multiplexing to the base station receiver as feedback information (rank information). This rank information is to affect greatly information transmission, and it is extremely important that the rank information is suitably transmitted to the base station receiver as feedback.

CITATION LIST

Non-Patent Literature

[Non-patent Literature 1] 3GPP TR 25.913 [1]

SUMMARY OF THE INVENTION

Technical Problem

As described above, in LTE-A, it is scheduled that the maximum system bandwidth is expanded to about 100 MHz, the maximum number of transmission antennas is expanded to eighth, and that the transmission rate of about maximum 500 Mbps in uplink is achieved. To achieve such a transmission rate in uplink, it is essential to use uplink MIMO transmission, and in this uplink MIMO transmission, it is expected to effectively exploit rank adaptation as in downlink MIMO transmission. However, in the successor system to LTE such as LTE-A, methods are not determined for feedback of rank information in rank adaptation in uplink MIMO transmission. From the property of the MIMO antenna system, it is conceivable that it is requested to determine such a feedback method of rank information in consideration of feedback information (feedback information for precoding) for transmitting the phase/amplitude control amount (PMI: Precoding Matrix Indicator) to be set on the antenna of the mobile station transmitter to the base station transmitter as feedback.

An object of the invention is made in view of such circumstances, and it is the object to provide a base station apparatus and information feedback method for enabling feedback information for rank adaptation and precoding in uplink MIMO transmission to be suitably transmitted to a user apparatus as feedback.

Solution to Problem

A base station apparatus of the invention is characterized by having a rank information determining section configured to determine rank information associated with the number of layers of spatial multiplexing in uplink, a control amount determining section configured to determine a control amount of a transmission phase and/or transmission amplitude used in weighting for transmission antennas of a user apparatus, and a transmission section configured to transmit the rank information determined in the rank information determining section to the user apparatus using a signal from a higher layer, while transmitting the control amount determined in the control amount determining section to the user apparatus using a control channel signal.

According to such a configuration, the rank information determined in the rank information determining section is transmitted to the user apparatus using a signal from the higher layer, the control amount determined in the control amount determining section is transmitted to the user apparatus using a control channel signal, and therefore, it is possible to suitably transmit the feedback information for rank adaptation and precoding in uplink MIMO transmission to the user apparatus as feedback. Particularly, since the rank information is transmitted using a signal from the higher layer, it is possible to transmit the rank information to the user apparatus as feedback with high quality as compared with the case of transmitting using a control channel signal, it is thereby possible to prevent the rank information from being misidentified in the user apparatus, and it is thus possible to prevent deterioration of throughput performance and the like due to misidentification of the rank information. Further, since the control amount is transmitted using a control channel signal, it is possible to dynamically switch the control amount for the transmission antenna in uplink MIMO transmission, and it is thereby possible to actualize information transmission that flexibly responds to the channel state in uplink.

A base station apparatus of the invention is characterized by having a rank information determining section configured to determine rank information associated with the number of layers of spatial multiplexing in uplink, a control amount determining section configured to determine a control amount of a transmission phase and/or transmission amplitude used in weighting for transmission antennas of a user apparatus, and a transmission section configured to transmit the rank information determined in the rank information determining section, and the control amount determined in the control amount determining section to the user apparatus using a control channel signal.

According to such a configuration, the rank information determined in the rank information determining section and the control amount determined in the control amount determining section is transmitted to the user apparatus using a control channel signal, and therefore, it is possible to suitably transmit the feedback information for rank adaptation and precoding in uplink MIMO transmission to the user apparatus as feedback. Particularly, since both the rank information and the control amount is transmitted using a control channel signal, it is possible to dynamically switch the rank number in rank adaptation in uplink MIMO transmission, and the control amount in precoding, and it is thereby possible to actualize information transmission that flexibly responds to the channel state in uplink.

Advantageous Effects of the Invention

According to the invention, the rank information determined in the rank information determining section is transmitted to the user apparatus using a signal from the higher layer or a control channel signal, the control amount determined in the control amount determining section is transmitted to the user apparatus using a control channel signal, and therefore, it is possible to suitably transmit the feedback information for rank adaptation and precoding in uplink MIMO transmission to user apparatuses as feedback.

BRIEF DESCRIPTION OF DRAWINGS

FIG. 2 is a diagram showing an example of a code book provided in a base station apparatus according to Embodiment 1 of the invention;

FIG. 3 is a diagram showing another example of the code provided in the base station apparatus according to Embodiment 1;

FIG. 10 is a diagram showing an example of a code book provided in a base station apparatus according to Embodiment 2 of the invention;

FIG. 11 is a diagram showing another example of the code provided in the base station apparatus according to Embodiment 2;

DESCRIPTION OF EMBODIMENTS

Figure 1:
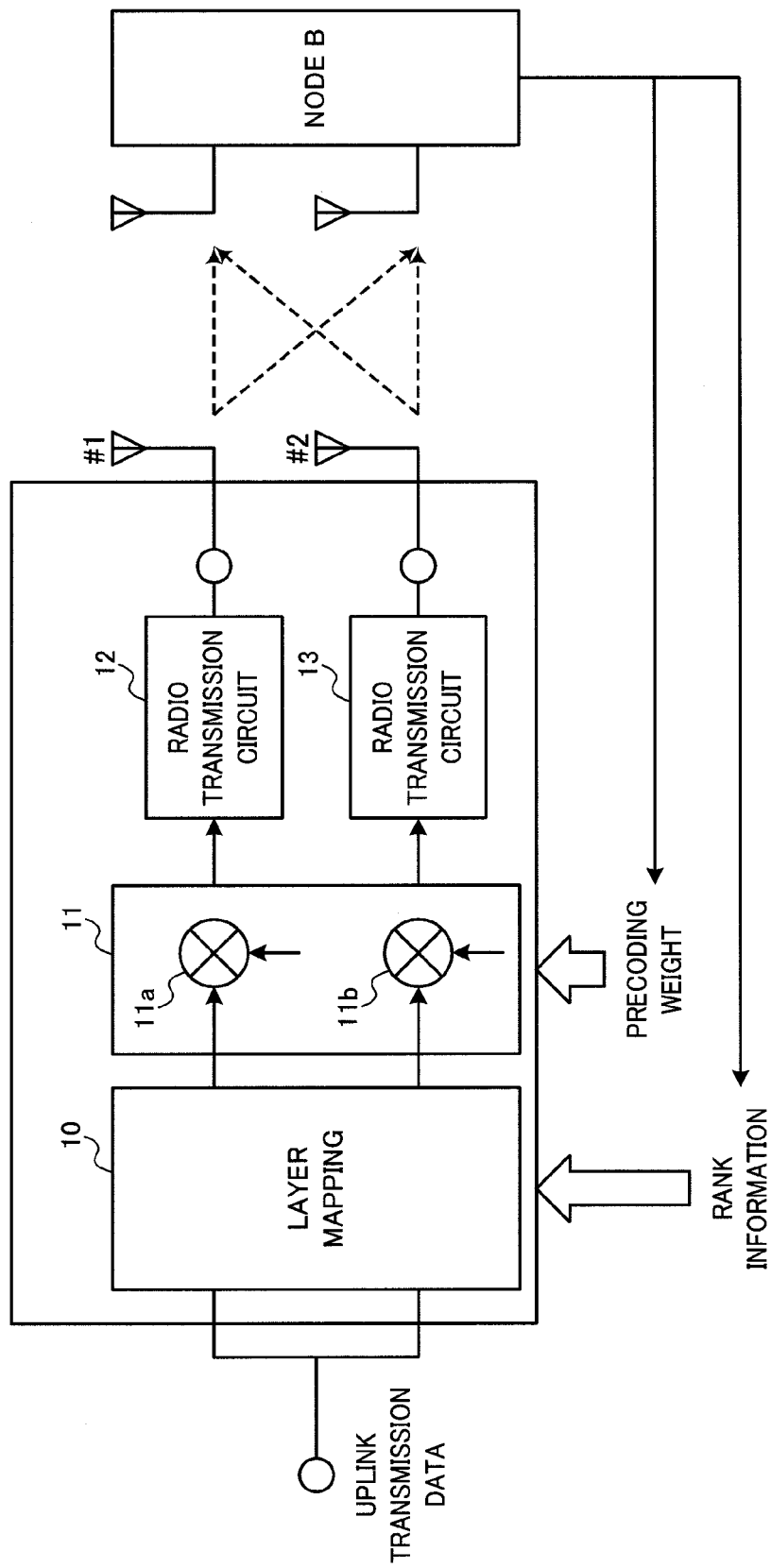
FIG. 1 is a conceptual diagram of a MIMO system to which the invention is applied.

Embodiments of the invention will specifically be described below with reference to accompanying drawings. First, with respect to rank adaptation and precoding in uplink MIMO transmission performed in a MIMO system to which a base station apparatus according to the invention is applied, the description is given based on a MIMO system as shown in FIG. 1 as a premise. FIG. 1 is a conceptual diagram of a MIMO system to which a base station apparatus Node B according to the invention is applied. In addition, in the MIMO system as shown in FIG. 1, the case is shown where each of a user equipment UE and the base station apparatus Node B has two transmission antennas.

In rank adaptation in uplink MIMO transmission in the MIMO system as shown in FIG. 1, the base station apparatus Node B selects rank information indicative of the optimal number of layers in spatial multiplexing, based on uplink channel states (reception SIR, fading correlation between antennas), and transmits the rank information to the user equipment UE in downlink as feedback. For example, the base station apparatus transmits the rank information (herein, rank information indicating that the number of layers is "2") indicating that information transmission is performed in the spatial multiplexing transmission mode, as feedback, to a user equipment UE excellent in the uplink channel states, while transmitting the rank information (herein, rank information indicating that the number of layers is "1") indicating that information transmission is performed in the transmission diversity transmission mode, as feedback, to a user equipment UE poor in the channel states. The user equipment UE determines the number of layers corresponding to the rank information that is sent as feedback from the base station apparatus Node B, and performs information transmission from each antenna.

Meanwhile, in precoding in uplink MIMO transmission in the MIMO system as shown in FIG. 1, the base station apparatus Node B measures a channel variation amount using a reception signal from each antenna, and based on the measured channel variation amount, selects a phase/amplitude control amount (precoding weight) that maximizes throughput (or reception SINR) that is obtained after transmission data from each transmission antenna is combined. Then, the selected precoding weight is transmitted to the user equipment UE in downlink as feedback. The user equipment UE performs precoding on transmission data corresponding to the precoding weight as feedback from the base station apparatus Node B, and then, performs information transmission from each antenna.

The base station apparatus Node B is provided with the function of determining optimal rank information in rank adaptation based on the channel states in uplink, and the function of determining optimal precoding weights in precoding, while being provided with the function of transmitting the rank information and precoding weights to the user equipment UE as feedback. For example, the base station apparatus Node B is provided with a code book that defines N precoding weights which are known between the base station apparatus Node B and user equipment UE, selects an optimal weight from among N precoding weights in the code book, and is capable of transmitting only the index to the user equipment UE as feedback. In the invention, transmitting the phase/amplitude control amount is of a concept for transmitting the precoding weight itself and transmitting only the index (number). In addition, the content of the code book provided in the base station apparatus Node B will be described later.

The user equipment UE is comprised of a layer mapping section 102 that distributes uplink transmission data corresponding to the number of layers, and two-system multipliers 11a, 11b and radio transmission circuits 12, 13 associated with two transmission antennas #1, #2. When uplink transmission data is input, the layer mapping section 10 distributes the data corresponding to the number of layers corresponding to the rank information transmitted from the base station apparatus Node B as feedback, the multipliers 11a, 11b multiply the uplink transmission data by precoding weights, and thereby control (shift) the phase and amplitude, and the transmission data with the phase and amplitude shifted is transmitted from two transmission antennas #1, #2.

The base station apparatus Node B according to the invention suitably transmits, to the user equipment UE, such rank information used in rank adaptation in uplink MIMO transmission and precoding weights used in precoding as feedback, and is to reliably achieve uplink MIMO transmission. Described below is an information feedback method used in uplink MIMO transmission in the base station apparatus Node B according to this Embodiment.

Embodiment 1

In the information feedback method in the base station apparatus Node B according to Embodiment 1, the rank information used in rank adaptation in uplink MIMO transmission is transmitted to the user equipment UE as feedback using a signal (for example, RRC signal) from the higher layer, while the precoding weight used in precoding in uplink MIMO transmission is transmitted to the user equipment UE as feedback using a control channel signal.

Herein, the rank information is information to notify the user equipment UE of the optimal number of layers of spatial multiplexing as feedback, and includes the rank number corresponding to the number of layers or information for enabling the rank number to be notified to the user equipment UE. The information for enabling the rank number to be notified to the user equipment UE includes the uplink transmission mode (i.e. spatial multiplexing transmission mode or transmission diversity transmission mode). In the following description, unless otherwise specified, the case that the rank information is the rank number is described.

In the information feedback method, since the rank information is transmitted as feedback using a signal (RRC signal) from the higher layer, as compared with the case of feedback using a control channel signal, it is possible to transmit the rank information to the user equipment UE as feedback with high quality, it is thereby possible to prevent the rank information from being misidentified in the user equipment UE, and it is thus possible to prevent deterioration of throughput performance and the like due to misidentification of the rank information. Meanwhile, since the precoding weight is transmitted to the user equipment UE as feedback using a control channel signal, it is possible to dynamically switch the precoding weight in uplink MIMO transmission, and it is thereby possible to actualize information transmission that flexibly responds to the channel state in uplink.

The base station apparatus Node B according to Embodiment 1 is beforehand provided with a code book that defines, for each rank information (rank number), a plurality of kinds of indexes representing precoding weights for antennas #1 and #2 of the user equipment UE, and is capable of transmitting only an index associated with the optimal precoding weight as feedback. In addition, the code book is also provided in the user equipment UE. FIG. 2 is a diagram showing an example of the code book provided in the base station apparatus Node B according to Embodiment 1. In the code book as shown in FIG. 2, four precoding weights (PMI: Precoding Matrix Indicator) are registered in association with Rank 1 that is selected in the case where the number of layer is "1" and Rank 2 that is selected in the case where the number of layers is "2", and the index is associated with each of the precoding weights.

The base station apparatus Node B transmits the rank information as feedback using an RRC signal, and further, transmits the index thus registered with the code book as feedback, and it is thereby possible to reduce the information amount required for performing feedback of the precoding weight. For example, when the base station apparatus sets the number of layers at "2" for the user equipment UE, and instructs the user equipment to perform information transmission using a precoding weight $W_{2,0}$, the base station apparatus transmits Rank 2 as feedback using an RRC signal, while transmitting index #0 as shown in FIG. 2 as feedback using a control channel signal. The user equipment UE receives the feedback of index #0 and is thereby capable of identifying the precoding weight $W_{2,0}$ by referring to the code book.

In addition, in transmitting the precoding weight used in precoding in uplink MIMO transmission, when the channel state in uplink deteriorates and estimation accuracy is poor in the channel variation using SRS (Sounding RS), there is a case that performing uplink MIMO transmission by open-loop control is preferable to performing uplink MIMO transmission by closed-loop control. FIG. 3 is diagram showing an example of the code book that defines uplink transmission modes corresponding to such open-loop control. In the code book as shown in FIG. 3, three precoding weights (PMI) in association with Rank 1 that is selected in the case where the number of layer is "1" and Rank 2 that is selected in the case where the number of layers is "2", and two uplink transmission modes corresponding to open-loop control are registered, and the index is associated with each of the precoding weights and the uplink transmission modes. In addition, the index associated with the uplink transmission mode functions as a transmission mode index. An OL (Open Loop) transmission diversity transmission mode is registered in the uplink transmission mode corresponding to open-loop control in Rank 1, while an OL spatial multiplexing transmission mode is registered in the uplink transmission mode corresponding to open-loop control in Rank 2, and each mode is associated with index #3.

The base station apparatus Node B transmits such an index registered with the code book as feedback, and it is thereby possible to reduce the information amount required for performing feedback of the precoding weight, while reducing deterioration of the reception quality when the channel state deteriorates in uplink and estimation accuracy of the channel variation degrades. For example, in transmitting Rank 1 as feedback by an RRC signal, in the case of transmitting index #3 as feedback, the base station apparatus is capable of notifying the user equipment UE of performing information transmission in the open-loop type transmission diversity transmission mode, as feedback.

Further, in the base station apparatus Node B according to Embodiment 1, in determining the optimal rank information in rank adaptation, it is made possible to select a band to measure the channel state in uplink. For example, the base station apparatus Node B is capable of selecting, as a measurement target, the channel state of the entire system band (herein, which is set at 40 MHz) of the MIMO system to which the base station apparatus Node B is applied as shown in FIG. 4(a), the channel state for each component carrier (herein, which is set at 20 MHz) obtained by dividing the system band of the MIMO system into a plurality of blocks as shown in FIG. 4(b), and the channel state for each cluster block in the case where resource blocks of a band assigned to the user equipment UE are divided into a plurality of cluster blocks such that a part of sub-bands are discrete in the MIMO system as shown in FIG. 4(c), and is capable of determining an optimal rank in each band.

In this case, as shown in FIG. 4(c), in the case where scheduled resource blocks are divided into a plurality of "clusters of sub-band" that are mutually discrete, each "cluster of sub-band" comprised of one or more sub-bands is referred to as a cluster block. Herein, the "cluster of sub-bands" comprised of sub-bands #2 and #3 is assumed to be a first cluster block, and the "cluster of sub-band" comprised of sub-band #5 is assumed to be a second cluster block. The base station apparatus Node B selects an optimal rank for each cluster block, and transmits two pieces of rank information, the rank information for the first cluster block and the rank information for the second cluster block, to the user equipment UE as feedback via downlink.

In thus selecting the optimal rank information in rank adaptation, it is made possible to select the band to measure the channel state in uplink, and it is thereby possible to obtain the effects for reducing the information amount in downlink corresponding to the channel state in uplink, and for improving backward compatibility with the LTE-system user equipment UE and throughput performance. In other words, when the optimal rank is selected corresponding to the channel state of the entire system band of the MIMO system, since information transmission is performed using the rank information common over the entire system band, it is possible to reduce the information amount used for feedback of the rank information in downlink. Meanwhile, when the optimal rank information is selected corresponding to the channel state for each component carrier obtained by dividing the system band of the MIMO system into a plurality of blocks, since an LTE-system user equipment UE such that the component carrier is the maximum supportable system band is also allowed to perform information transmission using the optimal rank information, it is possible to ensure backward compatibility with the user equipment UE. Further, when the optimal rank information is selected corresponding to the channel state for each cluster block assigned to the user equipment UE, it is possible to switch the number of layers of transmission data in the user equipment UE for each cluster block, and it is thereby possible to reduce reception errors in the base station apparatus Node B, and to improve throughput performance.

In addition, in the above-mentioned description, the case is described where the base station apparatus Node B transmits the rank number as the rank information to the user equipment UE as feedback using an RRC signal. In the case where the rank number is transmitted as rank information for feedback, the user equipment UE is capable of directing identifying the number of layers of the transmission data, and is capable of efficiently performing the processing for switching the number of layers of the transmission data. However, the uplink transmission mode may be used as described above as the rank information that is transmitted to the user equipment UE as feedback so as to actualize rank adaptation in uplink MIMO transmission. Also in the case where the uplink transmission mode is transmitted for feedback using an RRC signal as the rank information, it is possible to obtain the same effects as in performing feedback of the rank number. Particularly, when the uplink transmission mode is transmitted for feedback as the rank information, it is possible to decrease the kinds of information to perform feedback as compared with the rank number, and it is thereby possible to reduce the information amount to perform feedback of the rank information. Further, it is also possible to perform feedback of a combination of such an uplink transmission mode and rank number as the rank information.

Figure 5:
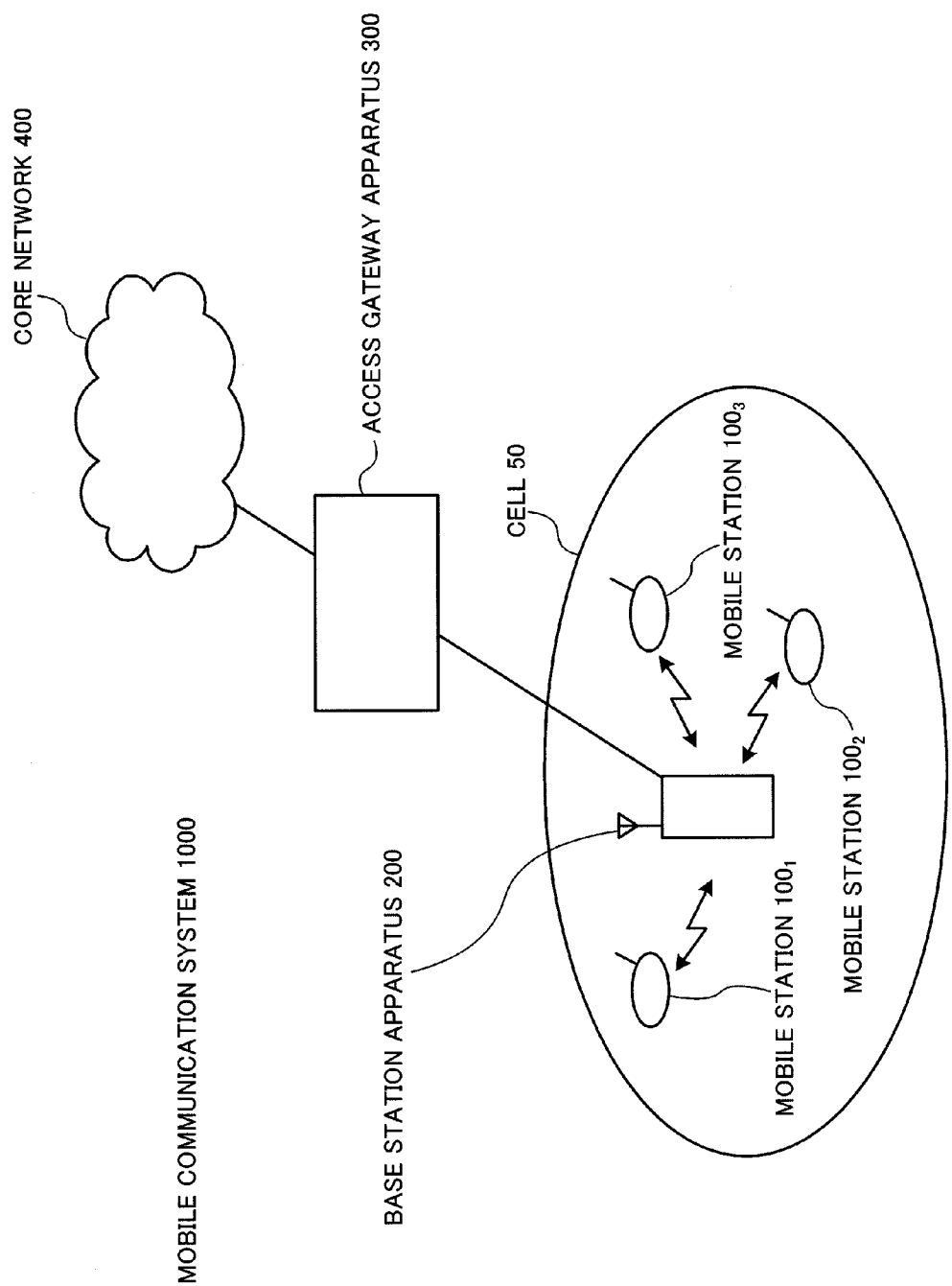
FIG. 5 is a network configuration diagram of a mobile communication system to which the base station apparatus according to Embodiment 1 is applied.

Described below is a configuration of a mobile communication system having the base station apparatus Node B and user equipment UE according to Embodiment 1. FIG. 5 is a network configuration diagram of a mobile communication system to which the base station apparatus Node B according to Embodiment 1 is applied.

A mobile communication system 1000 is a system to which, for example, LTE (Long Term Evolution)-Advanced is applied. The mobile communication system 1000 is provided with a base station apparatus 200 and a plurality of mobile stations 100 ($100_1$, $100_2$, $100_3$, . . . , $100_n$, n is an integer where n☐0) that communicate with the base station apparatus 200. The base station apparatus 200 is connected to an upper station apparatus, for example, access gateway apparatus 300, and the access gateway apparatus 300 is connected to a core network 400. The mobile station 100n communicates with the base station apparatus 200 in a cell 50 by Evolved UTRA and UTRAN. In addition, the access gateway apparatus 300 may be called MME/SGW (Mobility Management Entity/Serving Gateway).

Each mobile station ($100_1$, $100_2$, $100_3$, . . . , $100_n$) has the same configuration, function and state, and is described as a mobile station 100 unless otherwise specified in the following description. For convenience in description, the equipment that performs radio communication with the base station apparatus 200 is the mobile station 100, and more generally, is user equipment (UE) including mobile terminals and fixed terminals.

In the mobile communication system 1000, as a radio access scheme, radio access based on OFDMA (Orthogonal Frequency Division Multiplexing Access) is applied in downlink, while radio access based on SC-FDMA (Single-Carrier Frequency Division Multiple Access) is applied in uplink. Herein, OFDMA is a multicarrier transmission system for dividing a frequency band into a plurality of narrow frequency bands (subcarriers), and mapping data to each subcarrier to perform communication. SC-FDMA is a single-carrier transmission system for dividing the system band into bands comprised of a single or consecutive resource blocks for each terminal so that a plurality of terminals uses mutually different frequency bands, and thereby reducing interference among the terminals.

Described herein are communication channels in Evolved UTRA and UTRAN. In downlink, used are the Physical Downlink Shared Channel (PDSCH) shared among the mobile stations 100, and the Physical Downlink Control Channel (PDCCH, also called the downlink L1/L2 control channel) that is a downlink control channel. User data i.e. normal data signals are transmitted on the Physical Downlink Shared Channel. Further, on the Physical Downlink Control Channel is transmitted precoding information for uplink MIMO transmission, ID of a user who performs communications using the Physical Downlink Shared Channel, information of transport format of data of the user i.e. downlink scheduling information, ID of a user who performs communications using the Physical Uplink Shared Channel, information of transport format of data of the user i.e. uplink scheduling grant for feedback, etc.

Further, in downlink, broadcast channels such as the Physical-Broadcast Channel (P-BCH) and Dynamic Broadcast Channel (D-BCH) are transmitted. Information transmitted on the P-BCH is Master Information Block (MIB), and information transmitted on the D-BCH is System Information Block (SIB). The D-BCH is mapped to the PDSCH, and transmitted from the base station apparatus 200 to the mobile station 100n. In addition, with respect to an RRC signal for feedback of the rank information in the base station apparatus 200 according to Embodiment 1, the RRC signal is mapped to the PDSCH and transmitted to the mobile station 100n.

In uplink, used are the Physical Uplink Shared Channel (PUSCH) shared among the mobile stations 100, and the Physical Uplink Control Channel (PUCCH) that is a control channel in uplink. User data i.e. normal data signals are transmitted on the Physical Uplink Shared Channel. Meanwhile, on the Physical Uplink Control Channel is transmitted precoding information for downlink MIMO transmission, transmittal confirmation information in response to the downlink shared channel, radio quality information (CQI: Channel Quality Indicator) in downlink, etc.

Further, in uplink, defined is the Physical Random Access Channel (PRACH) for initial connection, etc. The mobile station 100 transmits a random access preamble to the base station apparatus 200 on the PRACH.

Figure 6:
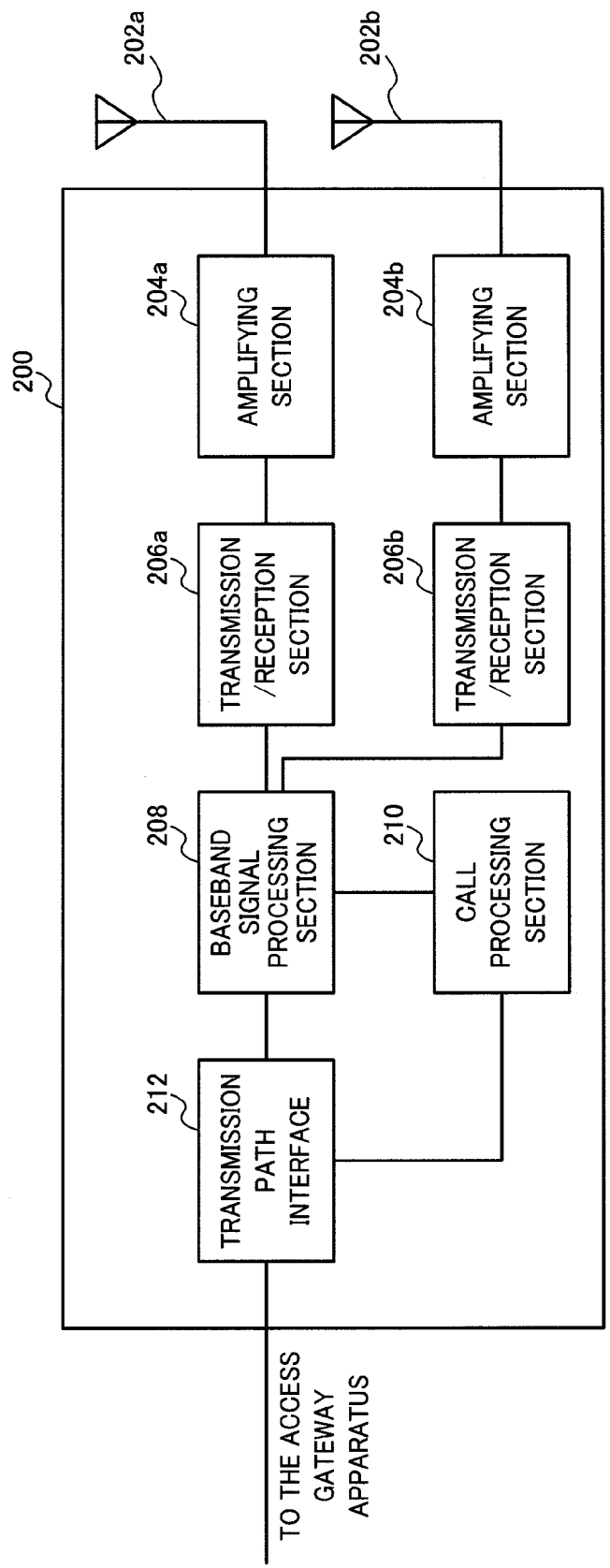
FIG. 6 is a partial block diagram illustrating a configuration of the base station apparatus according to Embodiment 1.

A configuration of the base station apparatus 200 according to Embodiment 1 will be described next with reference to FIG. 6. As shown in FIG. 6, the base station apparatus 200 according to this Embodiment is provided with two transmission/reception antennas 202a, 202b for MIMO transmission, amplifying sections 204a, 204b, transmission/reception sections 206a, 206b, baseband signal processing section 208, call processing section 210 and transmission path interface 216. In addition, the transmission/reception sections 206a, 206b function as the transmission section in the invention.

The user data transmitted from the base station apparatus 200 to the mobile station 100 in downlink is input to the baseband signal processing section 208 via the transmission path interface 212 from the upper station apparatus 300 positioned higher than the base station apparatus 200, for example, the access gateway apparatus 300.

The baseband signal processing section 208 performs PDCP layer processing, segmentation and concatenation of user data, RLC (Radio Link Control) layer transmission processing such as transmission processing of RLC retransmission control, MAC (Medium Access Control) retransmission control e.g. transmission processing of HARQ (Hybrid Automatic Repeat reQuest), scheduling, transmission format selection, channel coding, Inverse Fast Fourier Transform (IFFT) processing and precoding processing on the data to transfer to the transmission/reception sections 206a, 206b. Further, with respect to signals of the Physical Downlink Control Channel, the transmission processing such as channel coding and Inverse Fast Fourier Transform is performed, and the resultant is transferred to the transmission/reception sections 206a, 206b.

Further, on the above-mentioned broadcast channel, the baseband signal processing section 208 notifies the mobile station 100 of control information for communications in the cell 50 as feedback. For example, the control information for communications in the cell includes the system bandwidth in uplink or downlink, information of resource blocks allocated to the mobile station 100, identification information (Root Sequence Index) of a root sequence to generate a signal of a random access preamble on the PRACH, etc.

The transmission/reception sections 206a, 206b perform frequency conversion processing for converting the baseband signal which is precoded for each antenna and output from the baseband signal processing section 208 into signals with a radio frequency band, and then, the signals are amplified in the amplifying sections 204a, 204b, and are transmitted from the transmission/reception antennas 202a, 202b.

Meanwhile, with respect to data transmitted from the mobile station 100 to the base station apparatus 200 in uplink, radio frequency signals received in the transmission/reception antennas 202a, 202b are amplified in the amplifying sections 204a, 204b, subjected to frequency conversion in the transmission/reception sections 206a, 206b, thereby converted into baseband signals, and are input to the baseband signal processing section 208.

The baseband signal processing section 208 performs FFT processing, IDFT processing, error correcting decoding, reception processing of MAC retransmission control, and reception processing of RLC layer and PDCP layer on the user data included in the input baseband signals, and transfers the resultant to the access gateway apparatus 300 via the transmission path interface 212.

The call processing section 210 performs call processing such as setting and release of the communication channel, status management of the radio base station 200, and management of radio resources.

Figure 7:
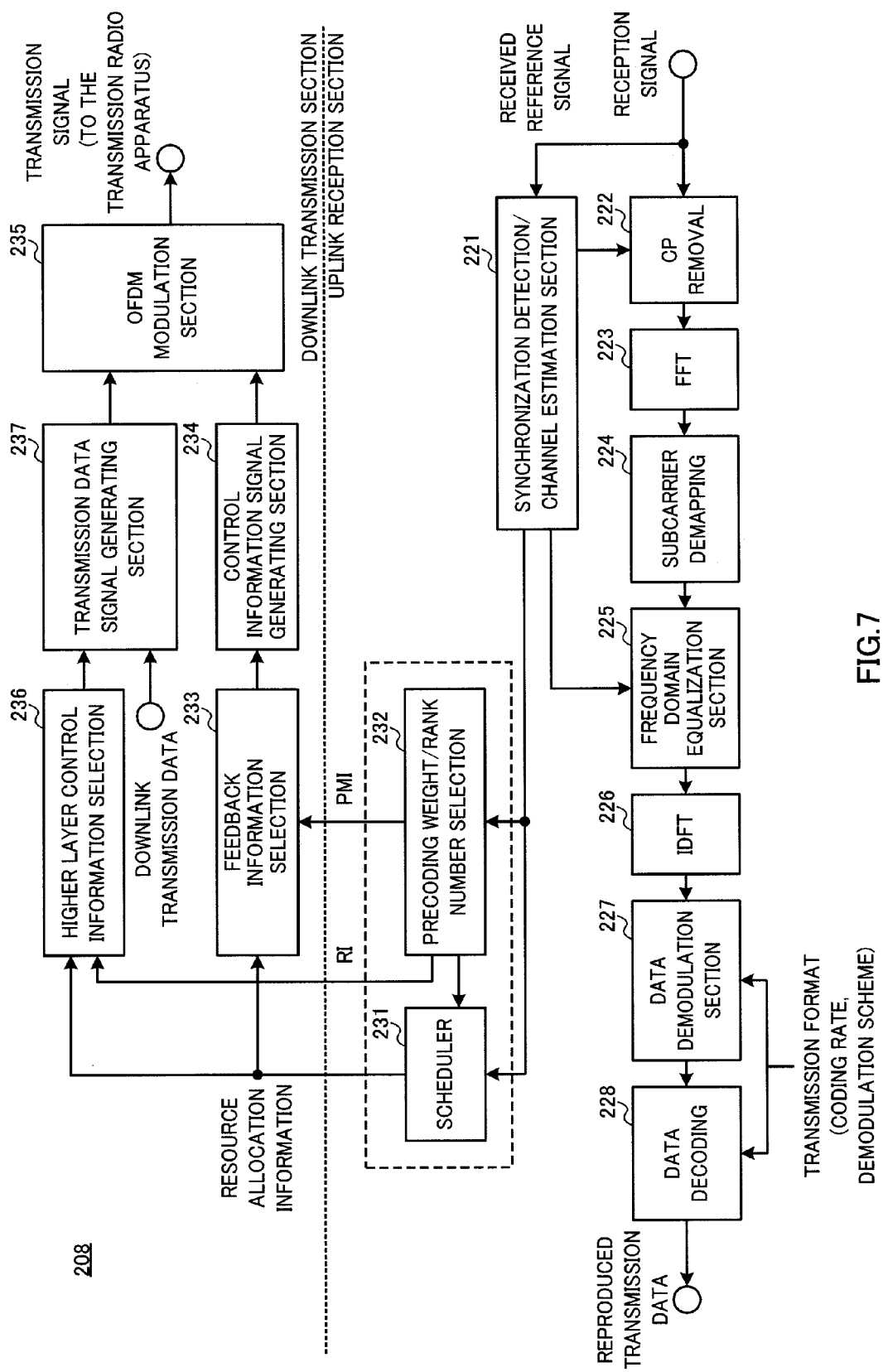
FIG. 7 is a functional block diagram of a baseband signal processing section in the base station apparatus according to Embodiment 1.

FIG. 7 is a functional block diagram of the baseband signal processing section 208 of the base station apparatus 200 according to Embodiment 1. A reference signal included in the reception signal is input to a synchronization detection/channel estimation section 221. The synchronization detection/channel estimation section 221 estimates a channel state in uplink based on the reception state of the reference signal received from the mobile station 100. Meanwhile, with respect to the reception signal input to the baseband signal processing section 208, a CP (Cyclic Prefix) removing section 222 removes a cyclic prefix that is added to the reception signal, and then, a Fast Fourier Transform section 223 performs Fourier transform on the resultant to transform into information in the frequency domain. The reception signal transformed to the information in the frequency domain is demapped in the frequency domain in a subcarrier demapping section 224. The subcarrier demapping section 224 performs demapping corresponding to mapping in the mobile station 100. A frequency domain equalization section 225 equalizes the reception signal based on a channel estimation value provided from the synchronization detection/channel estimation section 221. An inverse discrete Fourier transform section 226 performs inverse discrete Fourier transform on the reception signal, and restores the signal in the frequency domain to the signal in the time domain. Then, a data demodulation section 227 and data decoding section 228 demodulate and decode the transmission data based on a transmission format (coding rate, demodulation scheme).

A scheduler 231 determines the uplink resource allocation based on the channel estimation value provided from the synchronization detection/channel estimation section 221. The reference signal used in quality measurement that is a basis of scheduling needs to occupy the band over all the resource blocks (system band). The mobile station 100 transmits a quality measurement reference signal with a broader band than resource blocks actually assigned as resource allocation. The scheduler 231 is capable of acquiring channel station information from a CQI measuring section, not shown. The CQI measuring section measures the channel state from the quality measurement reference signal with a broad band received from the mobile station 100.

A precoding weight/rank number selecting section 232 determines a precoding weight to control a phase and/or amplitude of a transmission signal for each antenna in the mobile station 100 from the uplink reception quality in resource blocks allocated to the mobile station 100, based on the channel estimation value provided from the synchronization detection/channel estimation section 221. In other words, the precoding weight/rank number selecting section 232 functions as the control amount determining section in the invention. Particularly, the precoding weight/rank number determining section 232 is capable of determining a precoding weight to control a phase and/or amplitude of a transmission signal for each antenna in the mobile station 100 from the uplink reception quality in resource blocks allocated to the mobile station 100. Further, the precoding weight/rank number selecting section 232 determines the rank number indicative of the number of layers of spatial multiplexing in uplink, based on the channel estimation value provided from the synchronization detection/channel estimation section 221. In other words, the precoding weight/rank number selecting section 232 functions as the rank information determining section in the invention.

In thus determining the precoding weight and rank number, the precoding weight/rank number selecting section 232 selects the precoding weight (PMI) and rank number (RI: Rank Indicator) that maximize throughput (or reception SINR). In determining the precoding weight, the section is provided with the above-mentioned code book that defines a plurality of kinds of indexes of precoding weighs, and is capable of selecting an index from the code book (see FIGS. 2 and 3). Further, in determining the rank number, the section is capable of selecting a band targeted for measurement in uplink (see FIG. 4).

Figure 4:
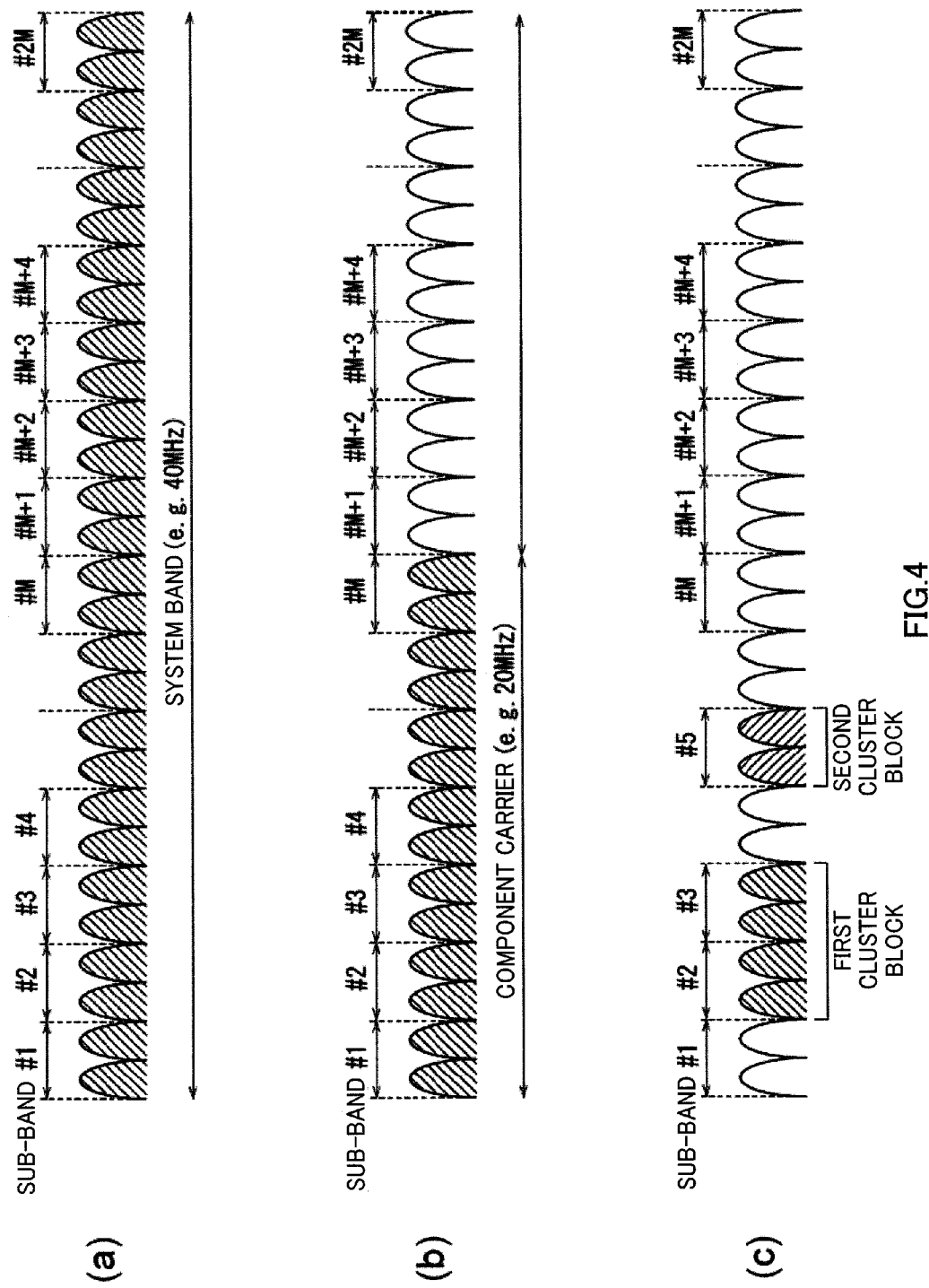
FIG. 4 contains diagrams showing an example of bands targeted for measurement in rank adaptation in the base station apparatus in Embodiment 1.

For example, the precoding weight/rank number selecting section 232 is capable of selecting, as a measurement target, the channel state of the entire system band (herein, which is set at 40 MHz) as shown in FIG. 4, and selecting an optimal rank number corresponding to the channel state. Meanwhile, the section is capable of selecting, as a measurement target, the channel state for each component carrier obtained by dividing the system band into a plurality of blocks as shown in FIG. 4(b), and selecting an optimal rank number corresponding to the channel state. Further, the section is capable of selecting, as a measurement target, the channel state for each cluster block in the case where resource blocks of the band assigned to the user equipment UE are divided into a plurality of cluster blocks such that a part of sub-bands are discrete as shown in FIG. 4(c), and selecting an optimal rank number corresponding to the channel state.

The feedback information selecting section 233 selects how many pieces of precoding information are eventually subjected to feedback from among precoding weights selected in the precoding weight/rank number selecting section 232. Then, the section 233 inputs the selected precoding information to a control information signal generating section 234 as feedback information. The control information signal generating section 234 receives the feedback information, and resource allocation information for the mobile station 100. Based on the feedback information and resource allocation information, the control information signal generating section 234 generates L1/L2 control information to multiplex into the Physical Downlink Control Channel to input to an OFDM modulation section 235.

A higher layer control information selecting section 236 selects which rank number is subjected to feedback based on the rank numbers selected in the precoding weight/rank number selecting section 232. More specifically, the section selects any of a single rank number over the entire system band, the rank numbers for each component carrier, and rank numbers for each cluster block. Then, the section inputs the selected rank number to a transmission data signal generating section 237 as the feedback information. The transmission data signal generating section 237 receives the feedback information and downlink transmission data for the mobile station 100. Based on the feedback information and downlink transmission data, the transmission data signal generating section 237 generates downlink transmission data to actually transmit on the Physical Downlink Shared Channel (PDSCH) to input to the OFDM modulation section 235. The downlink transmission data generated in the transmission data signal generating section 237 includes an RRC signal to transmit, as feedback, the rank number selected in the higher layer control information selecting section 236.

The OFDM modulation section 235 performs OFDM modulation processing on two-system signals including the L1/L2 control information input from the control information signal generating section 234 and the downlink transmission data input from the transmission data signal generating section 237, and outputs the resultant to the transmission/reception sections 206a, 206b.

Thus, in the base station apparatus 200, it is possible to select the rank number and precoding weight that maximize throughput (or reception SINR) based on the channel estimation value provided from the synchronization detection/channel estimation section 221, thereby including the rank number in the RRC signal, while including the precoding weight in the L1/L2 control information multiplexed into the PDCCH to transmit to the user equipment UE.

Figure 8:
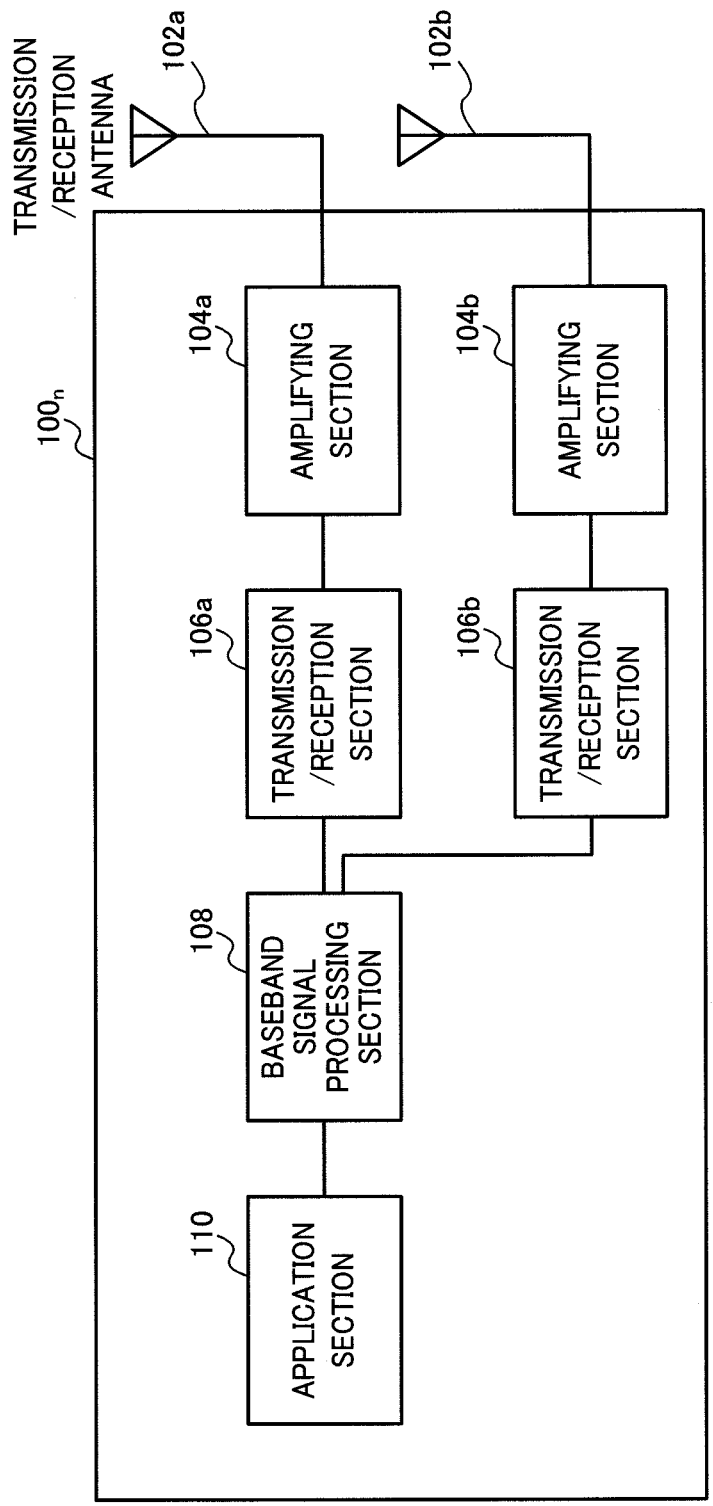
FIG. 8 is a partial block diagram illustrating a configuration of a mobile station according to Embodiment 1.

A configuration of the mobile station 100 according to Embodiment 1 will be described next with reference to FIG. 8. As shown in FIG. 8, the mobile station 100 according to this Embodiment is provided with two transmission/reception antennas 102a, 102b for MIMO transmission, amplifying sections 104a, 104b, transmission/reception sections 106a, 106b, baseband signal processing section 108 and application section 110.

With respect to data in downlink, radio frequency signals received in the two transmission/reception antennas 102a, 102b are amplified in the amplifying sections 104a, 104b, subjected to frequency conversion in the transmission/reception sections 106a, 106b, and are converted into baseband signals. The baseband signal is subjected to FFT processing, error correcting decoding, reception processing of retransmission control, etc. in the baseband signal processing section 108. Among the data in downlink, user data in downlink is transferred to the application section 110. The application section 110 performs processing concerning layers higher than the physical layer and MAC layer, etc. Further, among the data in downlink, broadcast information is also transferred to the application section 110.

Meanwhile, the application section 110 inputs user data in uplink to the baseband signal processing section 108. The baseband signal processing section 108 performs transmission processing of retransmission control (H-ARQ (Hybrid ARQ)), channel coding, precoding, DFT processing, IFFT processing, etc. on the data to transfer to the transmission/reception sections 106a, 106b. The transmission/reception sections 106a, 106b perform frequency conversion processing for converting the baseband signal output from the baseband signal processing section 108 into a signal with a radio frequency band, and then, the signals are amplified in the amplifying sections 104a, 104b, and are transmitted from the transmission/reception antennas 102a, 102b.

Figure 9:
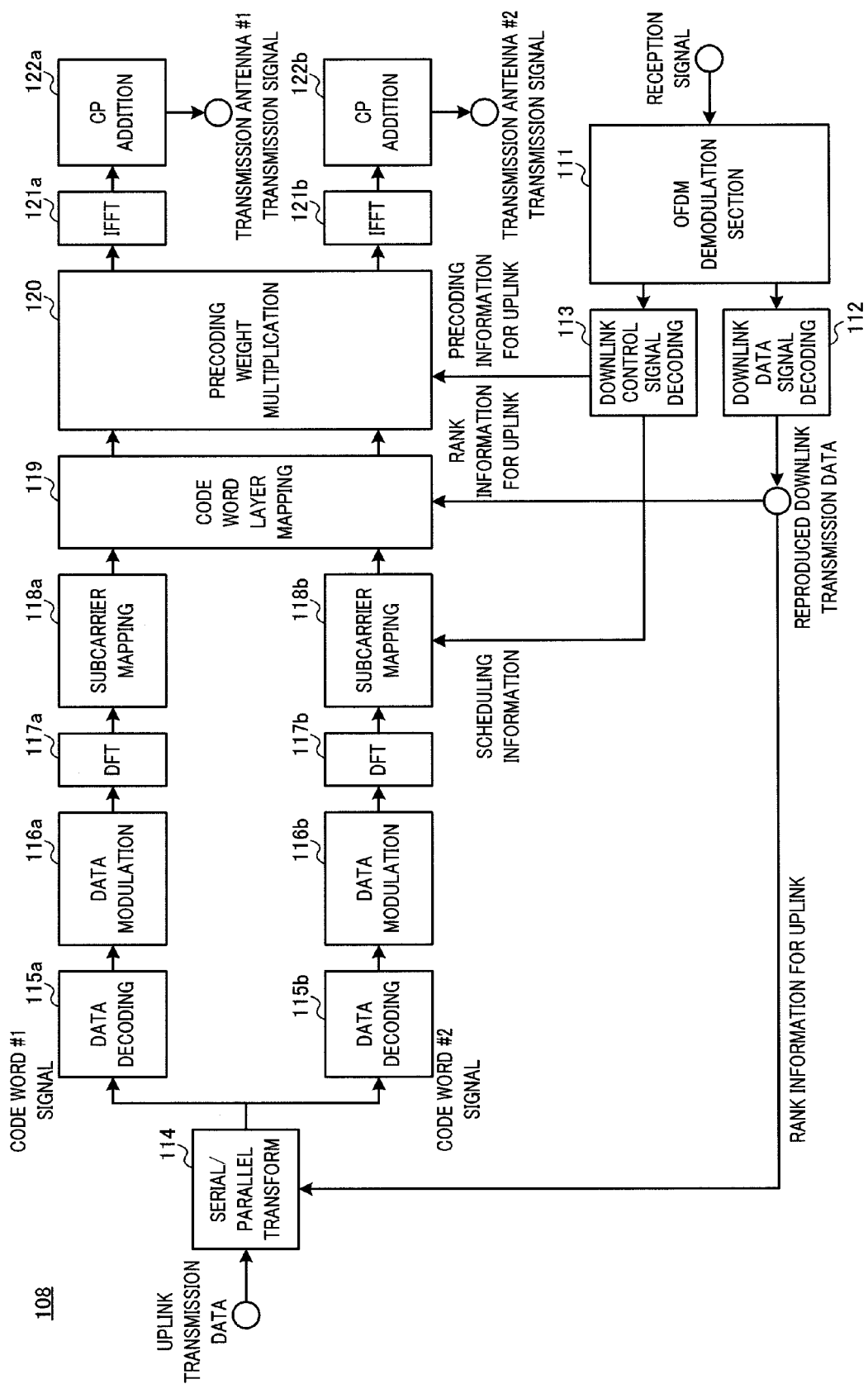
FIG. 9 is a functional block diagram of a baseband signal processing section in the mobile station according to Embodiment 1.

FIG. 9 is a functional block diagram of the baseband signal processing section 108 of the mobile station 100 according to Embodiment 1. Reception signals output from the transmission/reception sections 106a, 106b are demodulated in an OFDM demodulation section 111. Among the downlink reception signals demodulated in the OFDM demodulation section 111, a data signal is input to a downlink data signal decoding section 112, and a control signal (PDCCH) is input to a downlink control signal decoding section 113. The downlink data signal decoding section 112 decodes transmission data in downlink and reproduces the downlink transmission data. The reproduced transmission data includes the RRC signal for feedback of the uplink rank number. The downlink control signal decoding section 113 decodes the control signal (PDCCH) in downlink, and reproduces precoding information for uplink, scheduling information (resource allocation information), etc.

Among the downlink transmission data reproduced in the downlink data signal decoding section 112, the uplink rank number is input to a serial/parallel transform section 114 and code word layer mapping section 119, described later. The serial/parallel transform section 114 receives the uplink rank number and uplink transmission data. The serial/parallel transform section 114 performs serial/parallel transform on the transmission data corresponding to the number of code words according to the input uplink rank number. The code word indicates a coding unit of channel coding, and the number (the number of code words) is uniquely determined by the rank number and/or the number of transmission antennas. Shown herein is the case that the number of code words is determined to be two. In addition, the number of code words and the number of layers (rank number) are not necessarily the same. The transmission data (code word signal #1, code word signal #2) subjected to serial/parallel transform in the serial/parallel transform section 114 is input to data coding sections 115a, 115b.

The data coding section 115a codes the code word signal #1 from the serial/parallel transform section 114. The code word signal #1 coded in the data coding section 115a is modulated in a data modulation section 116a, and subjected to inverse Fourier transform in discrete Fourier transform section 117a, and the time-series information is transformed into information in the frequency domain. A subcarrier mapping section 118a performs mapping in the frequency domain based on the scheduling information from the downlink control signal decoding section 113. Then, the mapped code word signal #1 is input to the code word layer mapping section 119. Also in the data coding section 115b, data modulation section 116b, discrete Fourier transform section 117b, and subcarrier mapping section 118b, the same processing is performed on the code word signal #2, and the mapped code word signal #2 is input to the code word layer mapping section 119.

The code word layer mapping section 119 distributes the code word signals #1, #2 input from the subcarrier mapping sections 118a, 118b corresponding to number of layers, according to the uplink rank number from the downlink data decoding section 112. Then, the distributed code word signals #1, #2 are input to a precoding weight multiplying section 120.

The precoding weight multiplying section 120 shifts the phase and/or amplitude of a transmission signal (weighting for transmission antennas by precoding) for each of the transmission antennas 102a, 102b, based on the precoding information for uplink from the downlink control signal decoding section 113. By this means, it is possible to increase the reception power of the reception signal in the base station apparatus 200, and to improve the throughput performance. After precoding, inverse fast Fourier transform sections 121a, 121b perform inverse fast Fourier transform on the transmission signals, and thereby transform the signals in the frequency domain into signals in the time domain. Then, cyclic prefix adding sections 122a, 122b add cyclic prefixes to the transmission signals. Herein, the cyclic prefix functions as a guard interval for absorbing multipath propagation delay and the difference in reception timing among a plurality of users. The transmission signals with the prefix added thereto are output to the transmission/reception sections 106a, 106b.

Thus, the mobile station 100 decodes the downlink data signal and downlink control information transmitted from the base station apparatus 200, and obtains the rank number and precoding weight notified from the base station apparatus 200 as feedback. Then, based on the rank number and precoding weight, the mobile station 100 determines the number of layers of transmission data, performs precoding with the precoding weight, and then, transmits the transmission data from the antennas 102a, 102b. In other words, the mobile station 100 is capable of transmitting the transmission data to the base station apparatus 200, corresponding to the rank number and precoding weight transmitted from the base station apparatus 200 as feedback.

Thus, according to the base station apparatus 200 according to Embodiment 1, the rank information determined in the precoding weight/rank number selecting section 232 is transmitted to the mobile station 100 using an RRC signal, the precoding weight is transmitted to the mobile station 100 using a control channel signal, and therefore, it is possible to suitably transmit feedback information (rank information, precoding information) for rank adaptation and precoding in uplink MIMO transmission to the mobile station 100 as feedback. Then, the mobile station 100 is configured to determine the number of layers of transmission data corresponding to the rank information thus subjected to feedback, while shifting the phase and/or amplitude of the transmission signal for each of the transmission/reception antennas 102a, 102b corresponding to the precoding information, and it is thereby possible to actualize uplink MIMO transmission appropriately.

Embodiment 2

In the information feedback method in the base station apparatus Node B according to Embodiment 1, the rank information used in rank adaptation in uplink MIMO transmission is transmitted to the user equipment UE as feedback using a signal (RRC signal) from the higher layer, while the precoding weight used in precoding in uplink MIMO transmission is transmitted to the user equipment UE as feedback using a control channel signal. In an information feedback method in a base station apparatus Node B according to Embodiment 2, both the rank information used in rank adaptation in uplink MIMO transmission and the precoding weight used in precoding in uplink MIMO transmission is transmitted to the user equipment UE as feedback using a control channel signal, and in this respect, the method differs from the information feedback method in the base station apparatus Node B according to Embodiment 1.

In this information feedback method, since both the rank information and the precoding weight is transmitted to the user equipment UE as feedback using a control channel signal, it is possible to dynamically switch the rank number in rank adaptation in uplink MIMO transmission, and the precoding weight in precoding, and it is thereby possible to actualize information transmission that flexibly responds to the channel state in uplink.

The base station apparatus Node B according to Embodiment 2 is beforehand provided with a code book that defines a plurality of kinds of indexes representing combinations of precoding weights for antennas #1 and #2 of the user equipment UE and rank information (rank number), and is capable of transmitting only an index associated with the optimal rank information and precoding weight as feedback. In addition, the code book is also provided in the user equipment UE. FIG. 10 is a diagram showing an example of the code book provided in the base station apparatus Node B according to Embodiment 2. In the code book as shown in FIG. 10, combinations of Rank 1 that is selected in the case where the number of layer is "1" and four precoding weights (PMI), and combinations of Rank 2 that is selected in the case where the number of layers is "2" and four precoding weights (PMI) are registered, and the index is associated with each of the combinations.

The base station apparatus Node B thus transmits the index registered with the code book as feedback, and it is thereby possible to reduce the information amount required for feedback of the rank information and the precoding weight. For example, when the base station apparatus sets the number of layers at "2" for the user equipment UE, and instructs the user equipment to perform information transmission using a precoding weight $W_{2,0}$, the base station apparatus transmits index #4 as feedback using a control channel. The user equipment UE receives the feedback of index #4 and is thereby capable of identifying the precoding weight $W_{2,0}$ by referring to the code book.

Further, also in the base station apparatus Node B according to Embodiment 2, as in the base station apparatus Node B according to Embodiment 1, in selecting the optimal rank information in rank adaptation, it is possible to select a band to measure the channel state in uplink. In other words, also in the base station apparatus Node B according to Embodiment 2, it is possible to select the channel state of the entire system band, the channel state for each component carrier and the channel state for each cluster block as a measurement target, and to select the optimal rank information in each band.

In addition, in the base station apparatus Node B, both the code book as shown in FIG. 10 and the code book as shown in FIG. 2 may be provided, and the rank information and precoding weight may be transmitted to the user equipment UE, using an index indicative of a combination of the rank information and the precoding weight and an index indicative of the precoding weight. In thus performing feedback of the rank information and the precoding weight, in the case where the rank information is subjected to feedback for each cluster block as shown in FIG. 4(c) and the rank information for feedback is common, it is possible to reduce the information amount for performing feedback of the rank information. For example, in the case that the rank numbers of the first and second cluster blocks as shown in FIG. 4(c) are common and Rank 2 and that the precoding weights of the first and second cluster blocks are respectively $W_{2,0}$ and $W_{2,3}$, index #0 as shown in FIG. 10 is first transmitted as feedback, index #3 as shown in FIG. 2 is then transmitted as feedback, and it is thereby possible to reduce the information amount by the information amount for performing feedback of the rank number concerning the second cluster block.

Further, also in the feedback method in the base station apparatus Node B according to Embodiment 2, in transmitting the precoding weight used in precoding in uplink MIMO transmission, when the channel state in uplink deteriorates and estimation accuracy is poor in the channel variation using SRS (Sounding RS), there is a case that performing uplink MIMO transmission by open-loop control is preferable to performing uplink MIMO transmission by closed-loop control. FIG. 11 is diagram showing an example of the code book that defines uplink transmission modes corresponding to such open-loop control. In the code book as shown in FIG. 11, combinations of Rank 1 that is selected in the case where the number of layers is "1" and three precoding weights (PMI), combinations of Rank 2 that is selected in the case where the number of layer is "2" and three precoding weights (PMI), and two uplink transmission modes corresponding to open-loop control are registered, and the index is associated with each of the precoding weights and the uplink transmission modes. In the uplink transmission mode corresponding to open-loop control, an OL (Open Loop) transmission diversity transmission mode and OL spatial multiplexing transmission mode are registered, and are respectively associated with indexes #3, and #7.

The base station apparatus Node B transmits such an index registered with the code book as feedback, and it is thereby possible to reduce the information amount required for performing feedback of the rank information and the precoding weight, while reducing deterioration of the reception quality when the channel state deteriorates in uplink and estimation accuracy of the channel variation degrades. For example, in transmitting Rank 1 and precoding weight $W_{1,0}$ as feedback by a control channel signal, in the case of transmitting index #3 as feedback, the base station apparatus is capable of instructing the user equipment UE to perform information transmission in the open-loop type transmission diversity transmission mode.

In addition, in the information feedback method in the base station apparatus Node B according to Embodiment 2, in performing feedback of the rank information and the precoding weight, as a control channel signal, considered are the case of using the PDCCH, and the case of using a control channel signal (for example, PHICH (Physical Hybrid-ARQ Indicator Channel)) for feedback differing from the PDCCH. When the former channel is used as a control channel signal, it is possible to transmit the rank information and the precoding weight together with the control information such as the scheduling information, and it is thereby possible to perform feedback of the rank information and the precoding weight using an already-existing control channel signal. Meanwhile, when the latter signal is used as a control channel signal, it is possible to perform feedback of the rank information and the precoding weight with high quality as compared with the case of performing feedback of the rank information and the precoding weight on the PDCCH. By this means, it is possible to prevent the rank information from being misidentified in the user equipment UE, and it is thus possible to prevent deterioration of throughput performance and the like due to misidentification of the rank information.

Configurations of a base station apparatus 600 and mobile station 500 according to Embodiment 2 will be described below. The base station apparatus 600 and mobile station 500 according to Embodiment 2 are the same respectively as the base station apparatus 200 (see FIG. 6) and mobile station 100 (see FIG. 8) according to Embodiment 1 except configurations of baseband signal processing sections provided in the apparatus 600 and station 500. Further, a mobile communication system to which the base station apparatus 600 and mobile station 500 are applied is also the same as the mobile communication system 1000 according to Embodiment 1.

Figure 12:
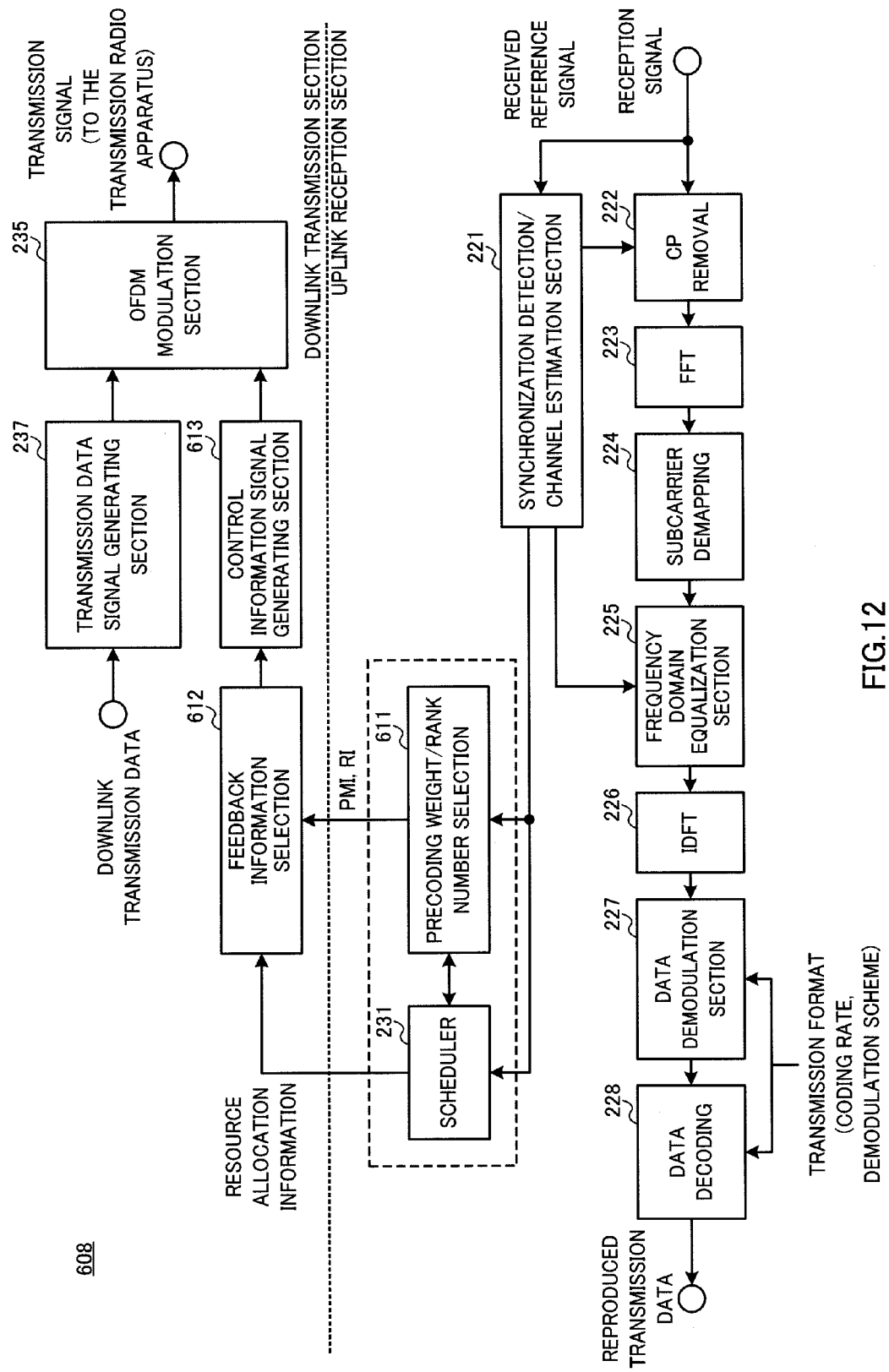
FIG. 12 is a functional block diagram of a baseband signal processing section in the base station apparatus according to Embodiment 2.
Figure 13:
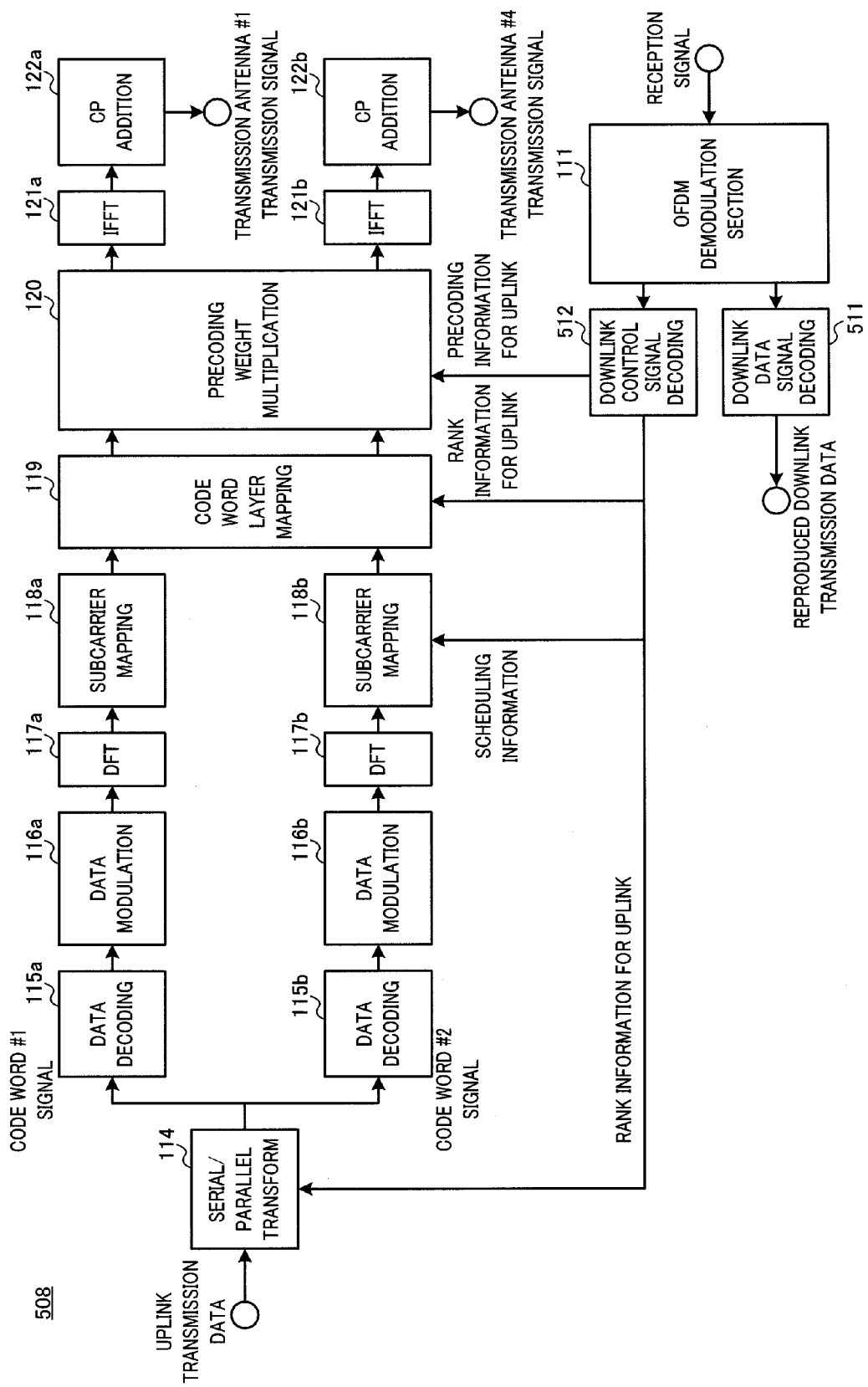
FIG. 13 is a functional block diagram of a baseband signal processing section in the mobile station according to Embodiment 2.

Referring to FIGS. 12 and 13, described next are configurations of a baseband signal processing section 608 provided in the base station apparatus 600 and a baseband signal processing section 508 provided in the mobile station 500. FIG. 12 is a functional block diagram of the baseband signal processing section 608 of the base station apparatus 600 according to Embodiment 2. FIG. 13 is a functional block diagram of the baseband signal processing section 508 of the mobile station 500 according to Embodiment 2. In addition, in the configurations of the baseband signal processing section 608 and baseband signal processing section 508 shown in FIGS. 12 and 13, the same components as in the baseband signal processing section 208 as shown in FIG. 7 and the baseband signal processing section 108 as shown in FIG. 9 are assigned the same reference numerals to omit descriptions thereof.

The baseband signal processing section 608 as shown in FIG. 12 differs from the baseband signal processing section 208 as shown in FIG. 7 in the respect that the section 608 is provided with a precoding weight/rank number selecting section 611, feedback information selecting section 612, and control information signal generating section 613, as a substitute for the precoding weight/rank number selecting section 232, feedback information selecting section 233, and control information signal generating section 234, and is not provided with the higher layer control information selecting section 236.

The precoding weight/rank number selecting section 611 inputs the determined precoding weight and rank number to the feedback information selecting section 612, and in this respect, differs from the precoding weight/rank number selecting section 232. The feedback information selecting section 612 has the function of the higher layer control information selecting section 236, and in this respect, differs from the feedback information selecting section 233. In other words, the feedback information selecting section 612 selects how many pieces of precoding information are eventually subjected to feedback from among precoding weights selected in the precoding weight/rank number selecting section 611, while selecting which rank number is subjected to feedback based on the rank number selected in the precoding weight/rank number selecting section 611. Then, the section 611 inputs the selected precoding weight and rank number to the control information signal generating section 613 as the feedback information. The control information signal generating section 613 generates L1/L2 control information to multiplex into the Physical Downlink Control Channel (PDCCH) based on the feedback information (precoding weight and rank number), and the resource allocation information for the mobile station 100, and in this respect, differs from the control information signal generating section 234.

The baseband processing section 608 has such a configuration, and the base station apparatus 600 is thereby capable of selecting the rank number and precoding weight that maximize throughput (or reception SINR) based on a channel estimation value provided from the synchronization detection/channel estimation section 221, and including both the rank number and the precoding weight in the L1/L2 control information multiplexed into the PDCCH to transmit to the user equipment UE.

Meanwhile, the baseband signal processing section 508 as shown in FIG. 13 is provided with a downlink data signal decoding section 511 and downlink control signal decoding section 512, as a substitute for the downlink data signal decoding section 112 and downlink control signal decoding section 113, and in this respect, differs from the baseband signal processing section 108 as shown in FIG. 9.

The downlink data signal decoding section 511 has only the function of decoding transmission data in downlink and reproducing the downlink transmission data, and in this respect, differs from the downlink data signal decoding section 112. In other words, the transmission data reproduced in the downlink data signal decoding section 511 does not include an RRC signal for feedback of the rank number in uplink. Therefore, the downlink data signal decoding section 511 does not input the rank number in uplink to the serial/parallel transform section 114. The downlink control signal decoding section 512 decodes the control signal (PDCCH) in downlink, and reproduces not only the precoding information for uplink, scheduling information (resource allocation information), etc. but also the rank number in uplink, and in this respect, differs from the downlink control signal decoding section 113. Further, the downlink control signal decoding section 512 inputs the rank number in uplink to the serial/parallel transform section 114 and code word layer mapping section 119, and in this respect, differs from the downlink control signal decoding section 113.

The baseband processing section 508 has such a configuration, and the mobile station 500 thereby decodes the downlink control information transmitted from the base station apparatus 600, and obtains the rank number and precoding weight transmitted from the base station apparatus 600 as feedback. Then, based on the rank number and precoding weight, the mobile station 500 determines the number of layers of transmission data, while performing precoding with the precoding weight, and then, transmits the transmission data from the antennas 102a, 102b. In other words, the mobile station 500 is capable of transmitting the transmission data to the base station apparatus 600 corresponding to the rank number and precoding weight transmitted from the base station apparatus 600 as feedback.

Thus, according to the base station apparatus 600 according to Embodiment 2, both the rank information and the precoding weight determined in the precoding weight/rank number selecting section 411 are transmitted to the mobile station 500 using a control channel signal, and therefore, it is possible to suitably transmit the feedback information (rank information, precoding information) for rank adaptation and precoding in uplink MIMO transmission to the mobile station 500 as feedback. Then, the mobile station 500 is configured to determine the number of layers of transmission data corresponding to the rank information thus subjected to feedback, while shifting the phase and/or amplitude of the transmission signal for each of the transmission/reception antennas 102a, 102b corresponding to the precoding information, and it is thereby possible to actualize uplink MIMO transmission appropriately.

In addition, in the above-mentioned descriptions, uplink SC-FDMA is the premise, but the invention is applicable in any scheme of OFDM, Clustered DFT-s-OFDM, and hybrid access.

In the above-mentioned descriptions, the invention is specifically described using the above-mentioned Embodiments, but it is obvious to a person skilled in the art that the invention is not limited to the Embodiments described in the description. The invention is capable of being carried into practice as modified and changed aspects without departing from the subject matter and scope of the invention defined by the descriptions of the scope of the claims. Accordingly, the descriptions of the description are intended for illustrative explanation, and do not have any restrictive meaning to the invention.

The present application is based on Japanese Patent Application No. 2009-148997 filed on Jun. 23, 2009, entire content of which is expressly incorporated by reference herein.

The invention claimed is:

1. A base station apparatus comprising:
   a rank information determining section configured to determine rank information associated with the number of layers of spatial multiplexing in uplink;
   a control amount determining section configured to determine a control amount of a transmission phase and/or transmission amplitude used in weighting for transmission antennas of a user apparatus;
   a code book in which a plurality of kinds of indexes is defined, the indexes each representing a combination of a control amount of a transmission phase and/or transmission amplitude and rank information indicating the number of layers of spatial multiplexing; and
   a transmission section configured to select an index associate with a combination of the rank information determined in the rank information determining section, and the control amount determined in the control amount determining section from the code book and transmit the index to the user apparatus using a control channel signal, wherein the rank information determining section determines the rank information corresponding to the optimal number of layers for each cluster block when resource blocks of a band assigned to the user apparatus are divided into a plurality of cluster blocks such that a part of sub-bands are discrete.

2. The base station apparatus according to claim 1, wherein the transmission section transmits the index associated with the rank information and the control amount to the user apparatus on a PDCCH.

3. The base station apparatus according to claim 1, wherein the transmission section transmits the index to the user apparatus using a control channel signal for feedback differing from a PDCCH.

4. The base station apparatus according to claim 1, wherein a transmission mode index for designating an open-loop type uplink transmission mode is defined in the code book, and the transmission section transmits the transmission mode index to the user apparatus.

5. The base station apparatus according to claim 1, wherein the rank information determining section determines the rank information corresponding to the optimal number of layers common in an entire system band.

6. The base station apparatus according to claim 1, wherein the rank information determining section determines the rank information corresponding to the optimal number of layers for each component carrier obtained by dividing a system band into a plurality of blocks.

7. The base station apparatus according to claim 4, further comprising:
   a first code book in which a plurality of kinds of first indexes is defined beforehand, the indexes each representing a combination of a control amount of a transmission phase and/or transmission amplitude used in weighting for transmission antennas of the user apparatus and rank information indicating the number of layers of spatial multiplexing in uplink; and
   a second code book in which a plurality of kinds of second indexes each representing a control amount of a transmission phase and/or transmission amplitude used in weighting for transmission antennas of the user apparatus is beforehand defined for each rank information of spatial multiplexing in uplink,
   wherein the transmission section transmits one of the first indexes as the rank information and the control amount for one of cluster blocks of the user apparatus, while transmitting one of the second indexes as the control amount for another one of the cluster blocks of the user apparatus.

8. An information feedback method comprising:
   determining rank information associated with the number of layers of spatial multiplexing in uplink;
   determining a control amount of a transmission phase and/or transmission amplitude used in weighting for transmission antennas of a user apparatus; and
   selecting an index associated with a combination of the determined rank information and the determined control amount from a code book in which a plurality of kinds of indexes is defined, the indexes each representing a combination of a control amount of a transmission phase and/or transmission amplitude and rank information indicating the number of layers of spatial multiplexing, and transmitting the index to the user apparatus using a control, channel signal, wherein the rank information is determined corresponding to the optimal number of layers for each cluster block when resource blocks of a band assigned to the user apparatus are divided into a plurality of cluster blocks such that a part of sub-bands are discrete.

* * * * *